United States Patent [19]

Shimizu et al.

[11] Patent Number: 4,839,243

[45] Date of Patent: Jun. 13, 1989

[54] RADIOGRAPHIC INTENSIFYING SCREEN

[75] Inventors: Etsuo Shimizu, Tokyo; Noboru Kotera, Odawara; Shinichi Onogi; Teiichi Hitomi, both of Chigasaki, all of Japan

[73] Assignee: Kasei Optonix, Ltd., Tokyo, Japan

[21] Appl. No.: 217,984

[22] Filed: Jul. 12, 1988

[30] Foreign Application Priority Data

Jul. 16, 1987 [JP]  Japan .................................. 62-176010
Jul. 20, 1987 [JP]  Japan .................................. 62-178944

[51] Int. Cl.$^4$ ........................... B32B 9/00; G03C 5/17; C09K 11/78
[52] U.S. Cl. ............................. 428/690; 252/301.4 R; 252/301.4 S; 250/486.1
[58] Field of Search ................. 252/301.4 S, 301.4 R; 428/690; 250/486.1

[56] References Cited

U.S. PATENT DOCUMENTS 4,387,141  6/1983  Patten ........................... 252/301.4 R
4,431,922  2/1984  Patten ........................... 252/301.4 R

FOREIGN PATENT DOCUMENTS 0103302  3/1984  European Pat. Off. .
0139192  5/1985  European Pat. Off. .
0202875  11/1986 European Pat. Off. .
861318   5/1978  France .

OTHER PUBLICATIONS

*Derwent Abstracts*, May 1988, "Fluorescent Screen or Sensitization Paper-for Colour Radiography", Dai-Nippon Paint Mfg. Co., Ltd.
*Derwent Abstracts*, Feb. 1981, "Green Light-Emitting Fluorescent Rare Earth Oxysulphide-Has High Light Emitting Efficiency, High Colour Purity and is Used for Colour CRT", Tokyo Shibaura Elec. Ltd.
*Derwent Abstracts*, Sep. 1981, "Green Light Emitting Fluorescent Material -Consists of Terbium and Dysprosium Activated Rare Earth Oxysulphide to which a Zinc Cpd. is Added", Kasei Optonix KK.

*Primary Examiner*—Jack Cooper
*Attorney, Agent, or Firm*—Oblon, Spivak, McClelland, Maier & Neustadt

[57] ABSTRACT

A radiographic intensifying screen comprising a support and a fluorescent layer formed thereon, said fluorescent layer consisting essentially of at least one terbium-activated rare earth oxysulfide phosphor of the formula:

$$(Ln_{1-x-y}, Tb_x, A_y)_2O_2S \qquad (I)$$

wherein Ln is at least one element selected from the group consisting of Y, La, Gd and Lu, A is at least one element selected from the group consisting of Ce, Pr, Nd, Dy, Er and Tm, and x and y are numbers within the ranges of $0.002 \leq x \leq 0.20$ and $0 \leq y \leq 0.01$, respectively, and at least one terbium-activated rare earth tantalate complex oxide phosphor of the formula:

$$(Ln'_{1-z}, Tb_z)_2O_3 \cdot mTa_2O_5 \cdot nB_2O_3 \qquad (II)$$

wherein Ln' is at least one element selected from the group consisting of Y, La, Gd and Lu, and z, m and n are numbers within the ranges of $0.0001 \leq z \leq 0.1$, $0.95 \leq m \leq 1.05$ and $0 \leq n \leq 5.0$, respectively.

7 Claims, 2 Drawing Sheets

RADIOGRAPHIC INTENSIFYING SCREEN

The present invention relates to a radiographic intensifying screen (hereinafter referred to simply as "intensifying screen"). More particularly, it relates to a green-emitting intensifying screen having a high speed and excellent image quality, particularly superior granularity.

As is well known, the intensifying screen is used to fit on an X-ray film to improve the speed in a photographic system in various fields including radiography for medical purposes such as X-ray radiography used for medical diagnosis and radiography for industrial purposes such as non-destructive inspection of materials.

As a typical example, an intensifying screen employing a CaWO$_4$ phosphor has been used for many years in combination with a regular type X-ray film. However, in recent years, it has been strongly desired to further improve the speed of the intensifying screen—X-ray film system with a view to reduction of the patients' dosage of radiation. Thus, the intensifying screen is desired to have a high photographic speed.

Under these circumstances, high speed intensifying screens have been developed wherein a phosphor having a higher X-ray absorption and a higher light conversion efficiency than the conventional CaWO$_4$ phosphor is used to increase the photographic speed of the intensifying screen. Among them, intensifying screens wherein a terbium-activated rare earth oxysulfide phosphor such as a Gd$_2$O$_2$S:Tb phosphor is used as the fluorescent layer, have been widely used as high speed intensifying screens in combination with orthochromatic-type X-ray films.

The intensifying screens are desired to have not only a high sensitivity to radiation (i.e. a high light conversion efficiency or a high photographic speed) but also good image quality such as low granularity and high sharpness.

The above intensifying screens wherein a terbium-activated rare earth oxysulfide phosphor is used as the fluorescent layer, have a substantially improved speed over the intensifying screens wherein the CaWO$_4$ phosphor is employed. However, they have a serious drawback that the granularity tends to increase (i.e. the image quality tends to be poor).

Various attempts have been made to solve the problem of granularity, including a method of providing a colored protective layer on the surface of the fluorescent layer (e.g. U.S. Pat. No. 4,362,944) and a method wherein a phosphor having its own color is employed (e.g. Japanese Examined Patent Publication No. 46150/1985).

It is an object of the present invention to provide an intensifying screen having the granularity reduced as compared with a conventional intensifying screen employing a terbium-activated rare earth oxysulfide phosphor known as a green-emitting high speed intensifying screen.

The present inventors have studied the relation between the types of phosphors and the photographic image quality of intensifying screens with respect to intensifying screens employing phosphors comprising various combinations of terbium-activated rare earth oxysulfide phosphors as the essential component with other X-ray phosphors and, as a result, have found that an intensifying screen containing in its fluorescent layer a terbium-activated rare earth oxysulfide phosphor and a terbium-activated rare earth tantalate complex oxide phosphor having a certain specific composition has remarkably low granularity as compared with an intensifying screen employing the terbium-activated rare earth oxysulfide phosphor alone, and yet the deterioration in the sharpness can thereby be controlled.

Thus, the present invention provides a radiographic intensifying screen comprising a support and a fluorescent layer formed thereon, said fluorescent layer consisting essentially of at least one terbium-activated rare earth oxysulfide phosphor of the formula:

$$(Ln_{1-x-y}, Tb_x, A_y)_2O_2S \quad (I)$$

wherein Ln is at least one element selected from the group consisting of Y, La, Gd and Lu, A is at least one element selected from the group consisting of Ce, Pr, Nd, Dy, Er and Tm, and x and y are numbers within the ranges of $0.002 \leq x \leq 0.20$ and $0 \leq y \leq 0.01$, respectively, and at least one terbium-activated rare earth tantalate complex oxide phosphor of the formula:

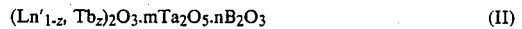
$$(Ln'_{1-z}, Tb_z)_2O_3 \cdot mTa_2O_5 \cdot nB_2O_3 \quad (II)$$

wherein Ln' is at least one element selected from the group consisting of Y, La, Gd and Lu, and z, m and n are numbers within the ranges of $0.0001 \leq z \leq 0.1$, $0.95 \leq m \leq 1.05$ and $0 \leq n \leq 5.0$, respectively.

The formula II includes a novel complex oxide phosphor represented by the formula:

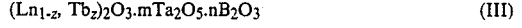
$$(Ln_{1-z}, Tb_z)_2O_3 \cdot mTa_2O_5 \cdot nB_2O_3 \quad (III)$$

wherein Ln is at least one element selected from the group consisting of Y, La, Gd and Lu, and m, n and z are numbers within the ranges of $0.95 \leq m \leq 1.05$, $0.01 \leq n \leq 5.0$ and $5 \times 10^{-4} \leq z \leq 0.1$, respectively.

Figure 1:
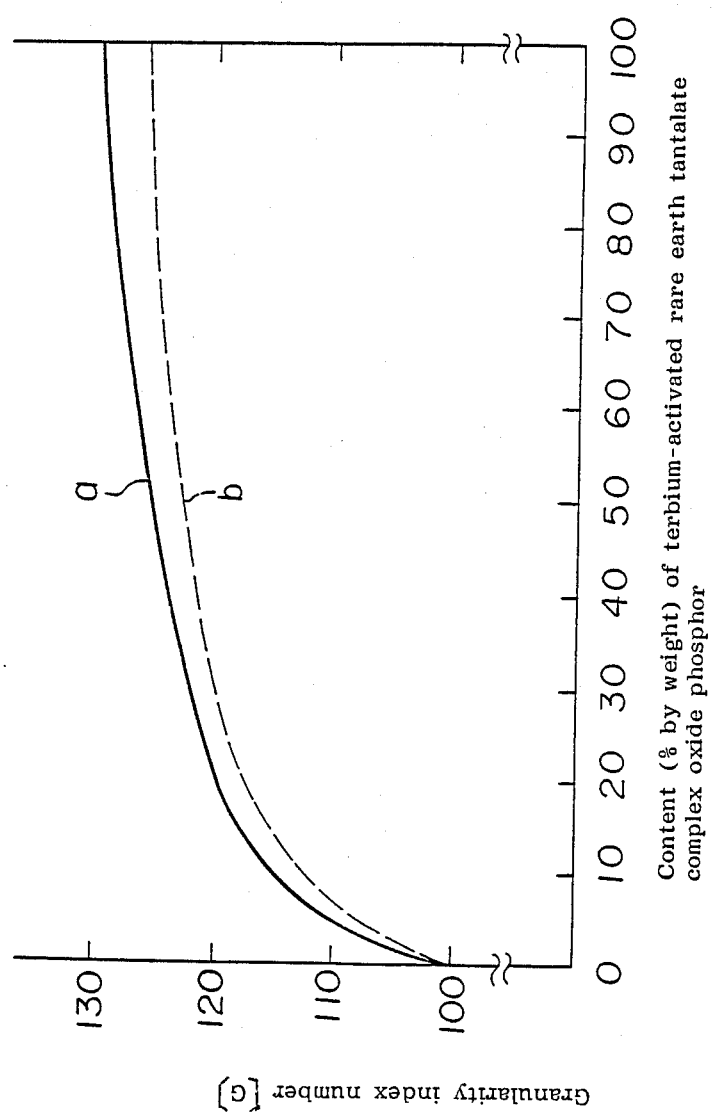
FIG. 1 is a graph showing the relation between the amount of the terbium-activated rare earth tantalate complex oxide phosphor contained in the fluorescent layer of an intensifying screen of the present invention and the granularity of the intensifying screen.

Now, the present invention will be described in detail with reference to the preferred embodiments.

The intensifying screen of the present invention can be prepared in the same manner as the preparation of conventional intensifying screens except that the terbium-activated rare earth oxysulfide phosphor and the terbium-activated tantalate complex oxide phosphor are used as phosphors.

Namely, according to a common method, proper amounts of the terbium-activated rare earth oxysulfide phosphor and the terbium-activated tantalate complex oxide phosphor are mixed with a binder such as nitrocellulose, and an organic solvent is further added thereto to obtain a coating dispersion of the phosphors having a suitable viscosity. This coating dispersion is then applied onto a support by means of a knife coater or a roll coater and dried to form a fluorescent layer. Some of intensifying screens have a structure in which a reflective layer such as a white pigment layer, a light absorptive layer such as a black pigment layer or a metal foil layer is interposed between the fluorescent layer and the support. In such a case, the reflective layer, light absorptive layer or metal foil layer may be preliminarily formed on the support as the case requires, and then a fluorescent layer may be formed thereon by applying and drying the above-mentioned coating dispersion of phosphors.

As the binder, conventional binders for intensifying screens may be used without any particular restriction. Such binders include, in addition to nitrocellulose, cellulose acetate, ethyl cellulose, polyvinyl butyral, linear polyester, polyvinyl acetate, a vinylidene chloride-vinyl chloride copolymer, a vinyl chloride-vinyl acetate copolymer, polyalkyl(meth)acrylate, polycarbonate, polyurethane, cellulose acetate butyrate, polyvinyl alcohol, gelatin, a polysuccharide such as dextran and gum arabic.

The organic solvent which may be used for the preparation of the coating dispersion of phosphors includes, for example, ethanol, methylethyl ether, butyl acetate, ethyl ether and xylene. To the coating dispersion of phosphors, a dispersant such as phthalic acid or stearic acid, or a plastisizer such as triphenyl phosphate or diethyl phthalate may be added, as the case requires.

On the fluorescent layer formed as described above, a protective layer may be formed as the case requires.

Such a protective layer may be formed by preparing a coating solution for a protective layer having a suitable viscosity by dissolving a cellulose derivative such as cellulose acetate, nitrocellulose or cellulose acetate butyrate, or a resin such as polyvinyl chloride, polyvinyl acetate, a vinyl chloride-vinyl acetate copolymer, polycarbonate, polyvinyl butyral, polymethyl methacrylate, polyvinyl formal or polyurethane in a solvent and coating and drying it on the fluorescent layer previously formed, or by laminating a previously formed protective layer such as a transparent film of e.g. polyethylene terephthalate, polyethylene, polyvinylidene chloride or polyamide on the fluorescent layer.

The support which may be used for the intensifying screen of the present invention includes a film of a resin such as cellulose acetate, cellulose propionate, cellulose acetate butyrate, a polyester such as the above-mentioned polyethylene terephthalate, polystyrene, polymethyl methacrylate, polyamide, polyimide, a vinyl chloride-vinyl acetate copolymer, or polycarbonate, a baryta paper, a resin-coated paper, a usual paper, an aluminum foil and an aluminum alloy foil. In a case where the above-mentioned plastic film or paper is used as the support for the intensifying screen of the present invention, a light absorptive substance such as carbon black or a light reflective substance such as titanium dioxide or calcium carbonate may be preliminarily incorporated into such a film or paper by kneading such a substance.

The intensifying screen of the present invention may be prepared by a method other than the above-mentioned method for its preparation.

Namely, such a method may comprise preliminarily forming a protective layer on a flat smooth surface, forming a fluorescent layer thereon, peeling off the fluorescent layer together with the protective layer from said substrate, and then bonding a support on the fluorescent layer afresh.

In order to obtain an intensifying screen having a particularly high photographic speed in the present invention, it is preferred to use a combination of a terbium-activated rare earth oxysulfide phosphor of the formular I wherein Ln is Gd or Y and A is nil i.e. $y=0$ with a terbium-activated rare earth tantalate complex oxide phosphor of the formula II wherein n is $0<n$ i.e. which necessarily contains $B_2O_3$, more preferably with a terbium-activated rare earth tantalate complex oxide phosphor of the formula II wherein Ln' is Gd and n is within a range of $0.1 \leq n \leq 2.0$.

The terbium-activated rare earth tantalate complex oxide phosphor of the formula II including the new phosphor of the formula III may be prepared by the following process.

As the phosphor raw materials, the following materials are used:

(i) One or more compounds selected from the group consisting of yttrium oxide ($Y_2O_3$), lanthanum oxide ($La_2O_3$), gadolinium oxide ($Gd_2O_3$), lutetium oxide ($Lu_2O_3$) and yttrium compounds, lanthanum compounds, gadolinium compounds and lutetium compounds capable of being readily converted by heating to $Y_2O_3$, $La_2O_3$, $Gd_2O_3$ and $Lu_2O_3$, respectively, such as nitrates, carbonates, chlorides, hydroxides and oxalates.

(ii) One or more compounds selected from the group consisting of tantalum oxide ($Ta_2O_5$) and tantalum compounds capable of being readily converted by heating to $Ta_2O_5$ such as tantalum dioxide ($TaO_2$) and tantalum chloride ($TaCl_5$).

(iii) One or more compounds selected from the group consisting of boron oxide ($B_2O_3$) and boron compounds capable of being converted by heating to $B_2O_3$ such as boric acid ($H_3BO_3$).

(iv) One or more compounds selected from the group consisting of terbium oxide ($Tb_2O_3$) and terbium compounds capable of being converted by heating to $Tb_2O_3$ such as nitrates, chlorides, carbonates and oxalates.

The above four types of phosphor raw materials are weighed and thoroughly mixed to obtain a mixture having a stoichiometrical composition represented by the formula:

$$(Ln'_{1-z}, Tb_z)_2O_3 \cdot mTa_2O_5 \cdot nB_2O_3 \qquad (II)$$

wherein Ln', m, n and z are as defined above. Needless to say, when $n=0$, the phosphor raw material (iii) is not used. The mixing may be conducted in a dry system by means of a ball mill, a mixer mill or a mortar, or in a wet system in the state of a paste by using e.g. water or an alcohol as a medium. In view of the intensity of luminance of the resulting phosphor, m, n and z are preferably within the ranges of $0.95 \leq m \leq 1.05$, $0.01 \leq n \leq 5.0$ and $5 \times 10^{-4} \leq z \leq 0.1$, respectively, more preferably $0.98 \leq m \leq 1.02$, $0.1 \leq n \leq 2.0$ and $2 \times 10^{-3} \leq z \leq 5 \times 10^{-2}$, respectively. When Ln' is Gd, a phosphor having particularly high luminance can be obtained.

The next step is a step of firing such a mixture of phosphor raw materials in a heat resistant container such as an alumina crucible or a quartz crucible. The firing is conducted usually within a temperature range of from 900° to 1500° C., preferably from 1000° to 1300° C. The firing may be conducted twice or more times. In such a case, it is preferred to conduct the first firing at a temperature of from 1000° to 1200° C., and the second and subsequent firing at a temperature of from 1100° to 1300° C. The firing time varies depending upon the amount of the raw materials and the firing temperature. However, it is usually from 1 to 16 hours. In general, the higher the firing temperature is, the shorter the firing time may be. For example, in a case where 15 hours of firing is required at a firing temperature of 1200° C., to obtain a complex oxide phosphor of the present invention having a predetermined intensity of luminance, the firing may be completed in one to four hours at a temperature of 1400° C.

At the time of the preparation of this terbium-activated rare earth tantalate complex oxide phosphor, a compound such as $Li_2SO_4$, LiCl or $BaCl_2$ may be incorporated to the phosphor raw materials prior to the first firing or the second or subsequent firing in the same manner as the process for the preparation of a rare earth tantalate phosphor disclosed in U.S. Pat. No. 4,225,653.

Further, it is possible to improve the intensity of luminance under X-ray exitation of the resulting phosphor by incorporating sodium fluoride (NaF) to the phosphor raw materials, followed by firing, or by preliminarily removing niobium (Nb) or manganese (Mn) in the phosphor raw materials adequately so that the Nb or Mn content in the resulting phosphor is minimized, at the time of the preparation of the terbium-activated rare earth tantalate complex oxide phosphor.

After completion of the firing, the fired product product is subjected to usual treatments employed commonly for the preparation of a phosphor, such as pulverization, washing, drying and sieving to obtain a terbium-activated rare earth tantalate complex oxide phosphor of the formula II.

This phosphor exhibits a green emission of high luminance not only under X-ray excitation but also under excitation with ultra-violet rays or electron beams. From the viewpoint of the photographic speed and sharpness of an intensifying screen, phosphors have preferred ranges with respect to the particle sizes and standard deviations. In the present invention, it is preferred to employ a combination of a terbium-activated rare earth oxysulfide phosphor having an average particle size of from 4 to 10 μm and a standard deviation (Q.D) of from 0.2 to 0.4 and a terbium-activated rare earth tantalate complex oxide phosphor having an average particle size of from 5 to 15 μm and a standard deviation of from 0.2 to 0.4 In the intensifying screen of the present invention, the content of the terbium-activated rare earth tantalate complex oxide phosphor in the fluorescent layer is preferably from 10 to 90% by weight, more preferably from 50 to 80% by weight, of the total amount of the phosphors.

If the content is less than 10% by weight, no substantial improvement will be obtained with respect to the granularity of the intensifying screen. On the other hand, if the content exceeds 90% by weight, the photographic speed tends to be substantially poor as compared with an intensifying screen employing the terbium-activated rare earth oxysulfide phosphor alone.

In the intensifying screen of the present invention, the coating weight of the fluorescent layer (weight per unit area of the fluorescent layer as dried after coating) is usually preferably within a range of from 30 to 200 $mg/cm^2$ to maintain the photographic speed and sharpness at practical levels. If the coating weight is less than 30 $mg/cm^2$, the photographic speed tends to decrease, and if it exceeds 200 $mg/cm^2$, the sharpness tends to decrease although the photographic speed may increase.

In the present invention, in view of the granularity of the intensifying screen, it is preferably to form a fluorescent layer so that the surface side of the fluorescent layer (the side opposite to the support) is constituted mainly by the terbium-activated rare earth tantalate complex oxide phosphor particles, instead of forming the entire fluorescent layer from the above mixture of two phosphors. The following two methods may be preferably employed for this purpose.

One of them is a method wherein a phosphor-coating dispersion containing only the terbium-activated rare earth oxysulfide phosphor as the phosphor is coated and dried on a support, and then a phosphor-coating dispersion containing only the terbium-activated rare earth tantalate complex oxide phosphor as the phosphor is coated and dried thereon.

The other method is a method wherein the viscosity of the phosphor-coating dispersion containing the mixture of the two phosphors is made sufficiently low, and this coating dispersion is coated and dried on a flat substrate having a protective layer preliminarily formed on its surface, so that during the drying process the terbium-activated rare earth tantalate complex oxide phosphor particles having a larger specific gravity are concentrated at the protective layer side by the difference in the sedimentation speeds due to the difference in the specific gravities of the two phosphors.

FIG. 1 illustrates the relationship between the content of the terbium-activated rare earth tantalate complex oxide phosphor in the fluorescent layer of an intensifying screen of the present invention and the granularity of the intensifying screen. Curves a and b represent intensifying screens using a combination of a $(Gd_{0.995}, Tb_{0.005})_2O_2S$ phosphor and a $(Gd_{0.97}, Tb_{0.03})_2O_3.Ta_2O_5$ phosphor and a combination of a $(Gd_{0.6}, Y_{0.394}, Tb_{0.005}, Tm_{0.001})_2O_2S$ phosphor and a $(Gd_{0.6}, Y_{0.37}, Tb_{0.03})_2O_3.Ta_2O_5.0.3B_2O_3$ phosphor, respectively, as the combination of the terbium-activated rare earth oxysulfide phosphor and the terbium-activated rare earth tantalate complex oxide phosphor in the fluorescent layer. The granularity index number [G] on the ordinate in FIG. 1 is a value defined by the following equation:

$$[G]=[RMS(0)]/[RMS(W)]\times 100$$

where [RMS(0)] is a RMS value of the conventional intensifying screen wherein the fluorescent layer is composed solely of the terbium-activated rare earth oxysulfide phosphor (i.e. the content of the terbium-activated rare earth tantalate complex oxide phosphor is 0%), and [RMS(W)] is a RMS value of the intensifying screen of the present invention containing also the terbium-activated rare earth tantalate complex oxide phosphor and having substantially the same photographic speed (in each case, the RMS value is at a photographic density of 1.0 and at a spatial frequency of from 0.5 to 5 lines/mm). The smaller the RMS value, the better the granularity. Accordingly, the greater the value of the granularity index number [G], the better the granularity over the conventional intensifying screen using the terbium-activated rare earth oxysulfide phosphor alone. As is evident from FIG. 1, by the incorporation of the terbium-activated rare earth tantalate complex oxide phosphor to the fluorescent layer containing the terbium-activated rare earth oxysulfide phosphor, the granularity of the resulting intensifying screen is improved, and the improvement in the granularity is particularly remarkable when the content exceeds 10% by weight.

Figure 2:
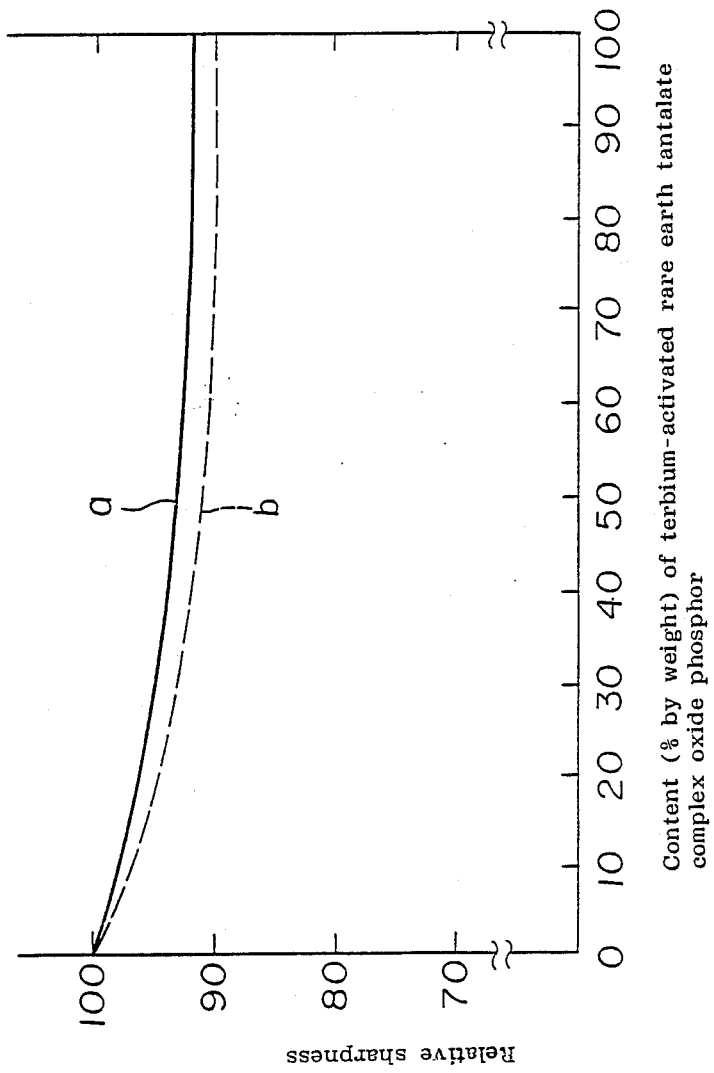
FIG. 2 is a graph showing the relation between the amount of the terbium-activated rare earth tantalate complex oxide phosphor contained in the fluorescent layer of an intensifying screen of the present invention and the sharpness of the intensifying screen.

FIG. 2 illustrates the relationship between the content of the terbium-activated rare earth tantalate complex oxide phosphor in the fluorescent layer of each of the intensifying screens as illustrated in FIG. 1 and the sharpness of the intensifying screen. Curves a and b represent the intensifying screens having fluorescent layers of the same combinations of phosphors as in FIG. 1, respectively. In FIG. 2, the relative sharpness on the ordinate is a relative value of the MTF value (the value at a spatial frequency of 2 lines/mm) of each intensifying screen of the present invention containing the terbium-activated rare earth tantalate complex oxide phosphor to the MTF value (the value at a spatial frequency of 2 lines/mm) of an intensifying screen using the terbium-activated rare earth oxysulfide phosphor alone (i.e. the content of the terbium-activated rear earth tantalate complex oxide phosphor is 0%) being 100. The larger the MTF value, the better the sharpness. Accordingly, it is evident from FIG. 2 that even when the terbium-activated tantalate complex oxide phosphor is incorporated to the fluorescent layer containing the terbium-activated rare earth oxysulfide phosphor, the sharpness of the resulting intensifying screen does not substantially decrease.

In FIGS. 1 and 2, the relationships between the content of the terbium-activated rare earth tantalate complex oxide phosphor and the graularity and between said content and the sharpness are illustrated with respect to intensifying screens of the present invention having fluorescent layers comprising a combination of a $(Gd_{0.995}, Tb_{0.005})_2O_2S$ phosphor and a $(Gd_{0.97}, Tb_{0.03})_2O_3.Ta_2O_5$ phosphor and a combination of a $(Gd_{0.6}, Y_{0.394}, Tb_{0.005}, Tm_{0.001})_2O_2S$ phosphor and a $(Gd_{0.6}, Y_{0.37}, Tb_{0.03})_2O_3.Ta_2O_5.0.3B_2O_3$ phosphor. Substantially the same relationships are obtained also when terbium-activated rare earth oxysulfide phosphors and terbium-activated rare earth tantalate complex oxide phosphors having compositions different from the above are employed. Thus, it has been confirmed that when a terbium-activated rare earth tantalate complex oxide phosphor is incorporated to the fluorescent layer containing a terbium-activated rare earth oxysulfide phosphor, although the photographic speed lowers as mentioned above, if comparison is made at substantially the same photographic speed level by increasing the coating weight of the phosphor layers, the granularity is remarkably improved over the conventional intensifying screen containing the terbium-activated rare earth oxysulfide phosphor alone and the decrease in the sharpness is relatively small.

Now, the present invention will be described with reference to Examples. However, it should be understood that the present invention is by no means restricted to such specific Examples.

EXAMPLES 1 TO 10

8 parts by weight of a phosphor mixture comprising a terbium-activated rare earth oxysulfide phosphor and a terbium-activated rare earth tantalate complex oxide phosphor having the compositions and particle sizes as identified in Table 1 in the proportions as identified in Table 1, 1 part by weight of nitrocellulose (binder) and an organic solvent were mixed to obtain a phosphor-coating dispersion. This phosphor-coating dispersion was uniformly applied by means of a knife coater on a polyethylene terephthalate support having a carbon black light absorptive layer on its surface so that the phosphor-coating weight after drying would be substantially as shown in Table 1, followed by drying to form a fluorescent layer. Then, a protective layer-coating solution obtained by dissolving cellulose acetate in a solvent was uniformly applied on the surface of this fluorescent layer so that the layer thickness after drying would be about 9 $\mu m$, followed by drying to form a transparent protective layer. In this manner, intensifying screens (1) to (10) were prepared.

COMPARATIVE EXAMPLES A TO G

On the other hand, for the purpose of comparison, intensifying screens (A) to (G) were prepared in the same manner as in the above intensifying screens (1) to (10) except that instead of the phosphor mixture comprising the terbium-activated rare earth oxysulfide phosphor and the terbium-activated rare earth tantalate complex oxide phosphor, a terbium-activated rare earth oxysulfide phosphor having the composition and particle size as identified in Table 1 was used, and the phosphor-coating dispersion thus prepared was applied so that the coating weight after drying would be substantially as shown in Table 1. The relative photographic speed, the granularity index number [G] and the relative sharpness (the relative value of MTF) of each intensifying screen thus prepared were measured by using an orthochromatic-type X-ray film and employing X-rays at an X-ray tube voltage of 80 KVp as a radiation source, whereby photographic properties as shown in Table 1 were obtained. As compared with an intensifying screen containing only a terbium-activated rare earth oxysulfide phosphor of the same composition, the granularity was improved and the decrease in the sharpness was small with each of the intensifying screens containing also terbium-activated rare earth tantalate complex oxide phosphors.

TABLE 1

| Intensifying screen No. [Example No.] | Phosphors used | | | Phosphor-coating weight $(mg/cm^2)$ | Photographic properties | | |
|---|---|---|---|---|---|---|---|
| | Composition | Average particle size ($\mu m$) | Standard deviation (Q.D.) | Proportions (wt %) | | Photographic speed (relative value) | Granularity index number [G] | Sharpness (relative value) |
| (A) [Comparative Example A] | $(Gd_{0.995}, Tb_{0.005})_2O_2S$ | 6.0 | 0.25 | 100 | 35 | 100 | 100 | 100 |
| (1) [Example 1] | $(Gd_{0.995}, Tb_{0.005})_2O_2S$ $(Gd_{0.97}, Tb_{0.03})_2O_3.Ta_2O_5$ | 6.0 5.8 | 0.25 0.24 | 70 30 | 38 | 100 | 122 | 95 |
| (2) [Example 2] | $(Gd_{0.995}, Tb_{0.005})_2O_2S$ $(Gd_{0.97}, Tb_{0.03})_2O_3.Ta_2O_5.0.5B_2O_3$ | 6.0 7.0 | 0.25 0.23 | 30 70 | 45 | 100 | 126 | 93 |
| (3) [Example 3] | $(Gd_{0.995}, Tb_{0.005})_2O_2S$ $(Y_{0.7}, La_{0.25}, Tb_{0.05})_2O_3.0.99Ta_2O_5.B_2O_3$ | 6.0 6.0 | 0.25 0.25 | 40 60 | 48 | 100 | 120 | 91 |
| (4) [Example 4] | $(Gd_{0.995}, Tb_{0.005})_2O_2S$ $(Y_{0.6}, Lu_{0.38}, Tb_{0.02})_2O_3.1.05Ta_2O_5.0.5B_2O_3$ | 6.0 5.8 | 0.25 0.28 | 40 60 | 50 | 100 | 115 | 93 |
| (B) | $(Gd_{0.6}, Y_{0.394},$ | 5.5 | 0.25 | 100 | 40 | 100 | 100 | 100 |

TABLE 1-continued

| Intensifying screen No. [Example No.] | Phosphors used Composition | Average particle size (μm) | Standard deviation (Q.D.) | Proportions (wt %) | Phosphor-coating weight (mg/cm$^2$) | Photographic speed (relative value) | Granularity index number [G] | Sharpness (relative value) |
|---|---|---|---|---|---|---|---|---|
| [Comparative Example B] | $(Tb_{0.005}, Tm_{0.001})_2O_2S$ | | | | | | | |
| (5) [Example 5] | $(Gd_{0.6}, Y_{0.394}, Tb_{0.005}, Tm_{0.001})_2O_2S$ | 6.0 | 0.25 | 50 | 45 | 100 | 123 | 91 |
| | $(Gd_{0.6}, Y_{0.37}, Tb_{0.03})_2O_3.Ta_2O_5.0.3B_2O_3$ | 5.5 | 0.25 | 50 | | | | |
| (C) [Comparative Example C] | $(Gd_{0.6}, La_{0.395}, Tb_{0.005})_2O_2S$ | 7.5 | 0.22 | 100 | 40 | 100 | 100 | 100 |
| (6) [Example 6] | $(Gd_{0.6}, La_{0.395}, Tb_{0.005})_2O_2S$ | 7.5 | 0.22 | 40 | 45 | 100 | 124 | 90 |
| | $(Gd_{0.8}, Y_{0.18}, Tb_{0.02})_2O_3.Ta_2O_5B_2O_3$ | 7.0 | 0.21 | 60 | | | | |
| (D) [Comparative Example D] | $(Gd_{0.994}, Tb_{0.005}, Dy_{0.001})_2O_2S$ | 6.5 | 0.21 | 100 | 38 | 100 | 100 | 100 |
| (7) [Example 7] | $(Gd_{0.994}, Tb_{0.005}, Dy_{0.001})_2O_2S$ | 6.5 | 0.21 | 40 | 40 | 100 | 125 | 95 |
| | $(Gd_{0.9}, Lu_{0.09}, Tb_{0.01})_2O_3.1.02Ta_2O_5.0.3B_2O_3$ | 7.0 | 0.25 | 60 | | | | |
| (E) [Comparative Example E] | $(Gd_{0.995}, Tb_{0.0048}, Pr_{0.0002})_2O_2S$ | 6.5 | 0.23 | 100 | 37 | 100 | 100 | 100 |
| (8) [Example 8] | $(Gd_{0.995}, Tb_{0.0048}, Pr_{0.0002})_2O_2S$ | 6.5 | 0.23 | 20 | 42 | 100 | 127 | 90 |
| | $(Gd_{0.99}, Tb_{0.01})_2O_3.Ta_2O_5.B_2O_3$ | 7.0 | 0.21 | 80 | | | | |
| (F) [Comparative Example F] | $(Gd_{0.995}, Tb_{0.0049}, Nd_{0.001})_2O_2S$ | 6.3 | 0.25 | 100 | 40 | 100 | 100 | 100 |
| (9) [Example 9] | $(Gd_{0.995}, Tb_{0.0049}, Nd_{0.001})_2O_2S$ | 6.3 | 0.25 | 80 | 43 | 100 | 115 | 95 |
| | $(Gd_{0.98}, Tb_{0.02})_2O_3.Ta_2O_5.B_2O_3$ | 7.0 | 0.23 | 20 | | | | |
| (G) [Comparative Example G] | $(Gd_{0.995}, Tb_{0.00498}, Ce_{0.00002})_2O_2S$ | 6.8 | 0.23 | 100 | 45 | 100 | 100 | 100 |
| (10) [Example 10] | $(Gd_{0.995}, Tb_{0.00498}, Ce_{0.00002})_2O_2S$ | 6.8 | 0.23 | 40 | 50 | 100 | 124 | 98 |
| | $(Gd_{0.98}, Tb_{0.02})_2O_3.Ta_2O_3.0.5B_2O_3$ | 6.5 | 0.25 | 60 | | | | |

Note 1: The sharpness is represented by a relative value of the MTF value of each intensifying screen at a spatial frequency of 2.0 lines/mm.
Note 2: The photographic properties of the intensifying screens [A] to [G] can not directly be compared to one another.

EXAMPLES 11 TO 13

8 parts by weight of a terbium-activated rare earth oxysulfide phosphor having the composition and particle size as identified in Table 2, 1 part by weight of nitrocellulose and an organic solvent were mixed to obtain a phosphor-coating dispersion containing the terbium-activated rare earth oxysulfide phosphor. This phosphor-coating dispersion was applied uniformly by means of a knife coater on a polyethylene terephthalate support having a carbon black light absorptive layer on its surface so that the phosphor-coating weight after drying would be substantially as shown in Table 2, followed by drying. Then, a phosphor-coating dispersion containing a terbium-activated rare earth tantalate complex oxide phosphor prepared in the same manner as above except that instead of the terbium-activated rare earth oxysulfide phosphor, the terbium-activated rare earth tantalate complex oxide phosphor having the composition and particle size as identified in Table 2 was used, was uniformly applied thereon so that the phosphor-coating weight after drying would be substantially as shown in Table 2, followed by drying to obtain a fluorescent layer. Then, a protective layer-coating solution obtained by dissolving cellulose acetate in an organic solvent, was uniformly applied on the surface of this fluorescent layer so that the layer thickness after drying would be about 9 μm, followed by drying to form a transparent protective layer. In this manner, intensifying screens (11) to (13) were prepared wherein a fluorescent layer containing a terbium-activated rare earth tantalate complex oxide phosphor is laminated on a fluorescent layer containing a terbium-activated rare earth oxysylfide phosphor.

With respect to the intensifying screens (11) to (13) thus prepared and the intensifying screen (A) prepared as in the previous Comparative Example, the relative photographic speed, the granularity index number [G] and the relative sharpness (the relative value of MTF) were measured by using an orthochromatic-type X-ray film and employing X-rays at an X-ray tube voltage of 80 KVp as a radiation source, whereby the photographic properties as shown in Table 2 were obtained. As compared with the intensifying screen containing only a terbium-activated rare earth oxysulfide phosphor of the same composition, the granularity was improved, and the decrease in the sharpness was small with each of the intensifing screens wherein a fluorescent layer containing a terbium-activated rare earth tantalate complex oxide phosphor is laminated at the protective layer side.

Tables 1 and 2 show the photographic porperties of the respective intensifying screens as measured by using X-rays at an X-ray tube voltage of 80 KVp as a radiation source. Substantially the same photographic properties were obtained also when X-rays at a low X-ray tube voltage of from 20 to 60 KVp were used.

$0.95 \leq m \leq 1.05$ and $0.01 \leq n \leq 5.0$, respectively wherein the content of the terbium-activated rare earth tantalate complex oxide phosphor in said fluorescent layer is from 10 to 90% by weight based on the total amount of the phosphors.

TABLE 2

| Intensifying screen No. [Example No.] | Phosphors used | | Average particle size (μm) | Standard deviation (Q.D.) | Phosphor-coating weight (mg/cm²) | Photographic speed (relative value) | Granularity index number [G] | Sharpness (relative value) |
|---|---|---|---|---|---|---|---|---|
| | Composition | | | | | | | |
| (A) [Comparative Example A] | | $(Gd_{0.995}, Tb_{0.005})_2O_2S$ | 6.0 | 0.25 | 35 | 100 | 100 | 100 |
| (11) [Example 11] | Support side | $(Gd_{0.995}, Tb_{0.005})_2O_2S$ | 6.0 | 0.25 | 28 | 100 | 125 | 92 |
| | Protective layer side | $(Gd_{0.97}, Tb_{0.03})_2O_3 \cdot Ta_2O_5$ | 5.8 | 0.24 | 12 | | | |
| (12) [Example 12] | Support side | $(Gd_{0.995}, Tb_{0.005})_2O_2S$ | 6.0 | 0.25 | 15 | 100 | 130 | 90 |
| | Protective layer side | $(Gd_{0.97}, Tb_{0.03})_2O_3 \cdot Ta_2O_5 \cdot 0.5B_2O_3$ | 7.0 | 0.23 | 33 | | | |
| (13) [Example 13] | Support side | $(Gd_{0.995}, Tb_{0.005})_2O_2S$ | 6.0 | 0.25 | 20 | 100 | 125 | 88 |
| | Protective layer side | $(Y_{0.7}, La_{0.25}, Tb_{0.05})_2O_3 \cdot 0.99Ta_2O_5 \cdot B_2O_3$ | 6.0 | 0.25 | 30 | | | |

Note 1: The sharpness is represented by a relative value of the MTF value of each intensifying screen at a spatial frequency of 2.0 lines/mm.

As described in detail in the foregoing, the intensifying screen of the present invention is far superior in the granularity to the conventional high speed-type intensifying screen containing a terbium-activated rare earth oxysulfide phosphor, and the decrease in the sharpness is relatively small. Accordingly, it is very useful as a high speed type intensifying screen to be used in combination with an orthochromatic-type X-ray film.

We claim:

1. A radiographic intensifying screen comprising a support and a fluorescent layer formed thereon, said fluorescent layer consisting essentially of at least one terbium-activated rare earth oxysulfide phosphor of the formula:

$$(Ln_{1-x-y}, Tb_x, A_y)_2O_2S \quad (I)$$

wherein Ln is at least one element selected from the group consisting of Y, La, Gd and Lu, A is at least one element selected from the group consisting of Ce, Pr, Nd, Dy, Er and Tm, and x and y are numbers within the ranges of $0.002 \leq x \leq 0.20$ and $0 \leq y \leq 0.01$ respectively, and at least one terbium-activated rare earth tantalate complex oxide phosphor of the formula:

$$(Ln'_{1-z}, Tb_z)_2O_3 \cdot mTa_2O_5 \cdot nB_2O_3 \quad (II)$$

wherein Ln' is at least one element selected from the group consisting of Y, La, Gd and Lu, and z, m and n are numbers within the ranges of $0.0005 \leq z \leq 0.1$, $0.95 \leq m \leq 1.05$ and $0.01 \leq n \leq 5.0$, respectively wherein the content of the terbium-activated rare earth tantalate complex oxide phosphor in said fluorescent layer is from 10 to 90% by weight based on the total amount of the phosphors.

2. The radiographic intensifying screen according to claim 1, wherein the content of the terbium-activated rare earth tantalate complex oxide phosphor in said fluorescent layer is from 50 to 80% by weight based on the total amount of the phosphors.

3. The radiographic intensifying screen according to claim 1, wherein the fluorescent layer has a double layer structure comprising a first layer formed on the support and consisting mainly of said terbium-activated rare earth oxysulfide phosphor and a second layer formed on the first layer and consisting mainly of said terbium-activated rare earth tantalate complex oxide phosphor.

4. The radiographic intensifying screen according to claim 1, wherein $0.98 \leq m \leq 1.02$.

5. The radiographic intensifying screen of claim 1, wherein $2 \times 10^{-3} \leq z \leq 5 \times 10^{-2}$.

6. The radiographic intensifying screen of claim 1, wherein $0.1 \leq n \leq 2.0$.

7. A complex oxide phosphor represented by the formula:

$$(Ln_{1-z}, Tb_z)_2O_3 \cdot mTa_2O_5 \cdot nB_2O_3 \quad (III)$$

wherein Ln is at least one element selected from the group consisting of Y, La, Gd and Lu, and m, n and z are numbers within the ranges of $0.95 \leq m \leq 1.05$, $0.01 \leq n \leq 5.0$ and $5 \times 10^{-4} \leq z \leq 0.1$, respectively.

* * * * *